US006634319B1

(12) United States Patent
Zermoglio et al.

(10) Patent No.: US 6,634,319 B1
(45) Date of Patent: Oct. 21, 2003

(54) AUTOMATIC MACHINE FOR VACCINATING CHICKS AND SIMILAR BIRDS

(75) Inventors: Lorenzo Zermoglio, Treviso (IT); Angelo Artuso, Venezia Mestre (IT)

(73) Assignee: Poultry Vacc. S.A.S. di Zermoglio Lorento & C. (IT)

( * ) Notice: Subject to any disclaimer, the term of this patent is extended or adjusted under 35 U.S.C. 154(b) by 26 days.

(21) Appl. No.: 09/926,719

(22) PCT Filed: Jun. 19, 2000

(86) PCT No.: PCT/EP00/05671

§ 371 (c)(1), (2), (4) Date: Feb. 13, 2002

(87) PCT Pub. No.: WO01/03605

PCT Pub. Date: Jan. 18, 2001

(30) Foreign Application Priority Data

Jul. 7, 1999 (IT) ........................................ VE99A0029

(51) Int. Cl.[7] ................................................ A01K 37/00
(52) U.S. Cl. ........................................................ 119/713
(58) Field of Search ........................... 119/6.8, 713, 843

(56) References Cited

U.S. PATENT DOCUMENTS 3,774,578 A * 11/1973 Randolph et al. ........... 119/714
4,446,819 A * 5/1984 Gourlandt ................... 119/714
4,681,565 A 7/1987 Gourlandt ................... 604/115
5,468,227 A * 11/1995 Haskell ...................... 604/156

FOREIGN PATENT DOCUMENTS

FR 2 276 839 1/1976

* cited by examiner

*Primary Examiner*—Robert P. Swiatek
(74) *Attorney, Agent, or Firm*—Hoffman, Wasson & Gitler

(57) ABSTRACT

An automatic machine for the multiple vaccination of chicks and similar birds, having at least one pair of side-by-side holders, each receiving a chick to be vaccinated. Each holder comprises a seat into which the head of the chick to be vaccinated is manually inserted, elements for automatically locking the chick's head inserted into the seat, a presser acting on the chick to stabilize that neck portion into which the injection is to be effected, mechanism for vertically moving, relative to the presser member, the seat in which the head of the chick is inserted and locked, mechanism for automatically operating the presser on termination of relative movement, at least one needle mounted on a member movable relative to the stabilized chick between the seat and the presser, for its insertion into the chick's neck below the skin, and mechanism for returning the needle, the presser and the locking elements after the injection has been effected, to enable the chick to fall spontaneously onto an underlying collection element.

5 Claims, 2 Drawing Sheets

AUTOMATIC MACHINE FOR VACCINATING CHICKS AND SIMILAR BIRDS

This invention relates to an automatic machine for vaccinating chicks and similar birds.

Chick vaccinating machines are known. With these, the newly born chicks originating from the incubator are firstly divided manually into males and females and are then taken with the hand and inserted by their head, individually or in pairs, into appropriate seats provided in a continuously rotating basket of an automatic machine. Each seat of this rotating basket is provided with a fork which retains the head of the chick, while its body remains dangling outwards.

During basket rotation, the chick passes in front of a vaccination station, in which one or more needles are inserted into its neck to vaccinate it under its skin.

This known machine is able to automatically vaccinate the chicks, but at the same time presents a series of drawbacks which this invention proposes to eliminate.

One of these drawbacks is the high constructional cost of the machine, mainly because of the number and complexity of the automatic controls required to effect the automatic vaccination cycle.

Another drawback is the laboriousness of the operations involved in setting up the machine, given the difficulty of exactly adjusting the relatively moving parts to ensure correct needle insertion into the neck of the chicks.

A further drawback is the need for careful daily maintenance, to ensure that the complex operating cycle is properly implemented.

A further drawback is the considerable wear to which the various parts are subjected, and hence the need for frequent replacement of worn parts.

A further drawback is the difficulty encountered by the operator in adapting to a rate of working substantially imposed by the rotation of the basket and hence not adaptable to the inevitable inaccuracies inherent in human working, especially in loading the chicks onto a moving member.

A further drawback is the potential danger of a member under continuous movement, in this case the rotating basket.

A further drawback is the considerable noise level of the machine, which often reaches the allowable limits.

All these drawbacks are eliminated according the invention by an automatic machine for vaccinating chicks and similar birds as described in claim 1.

Figure 1:
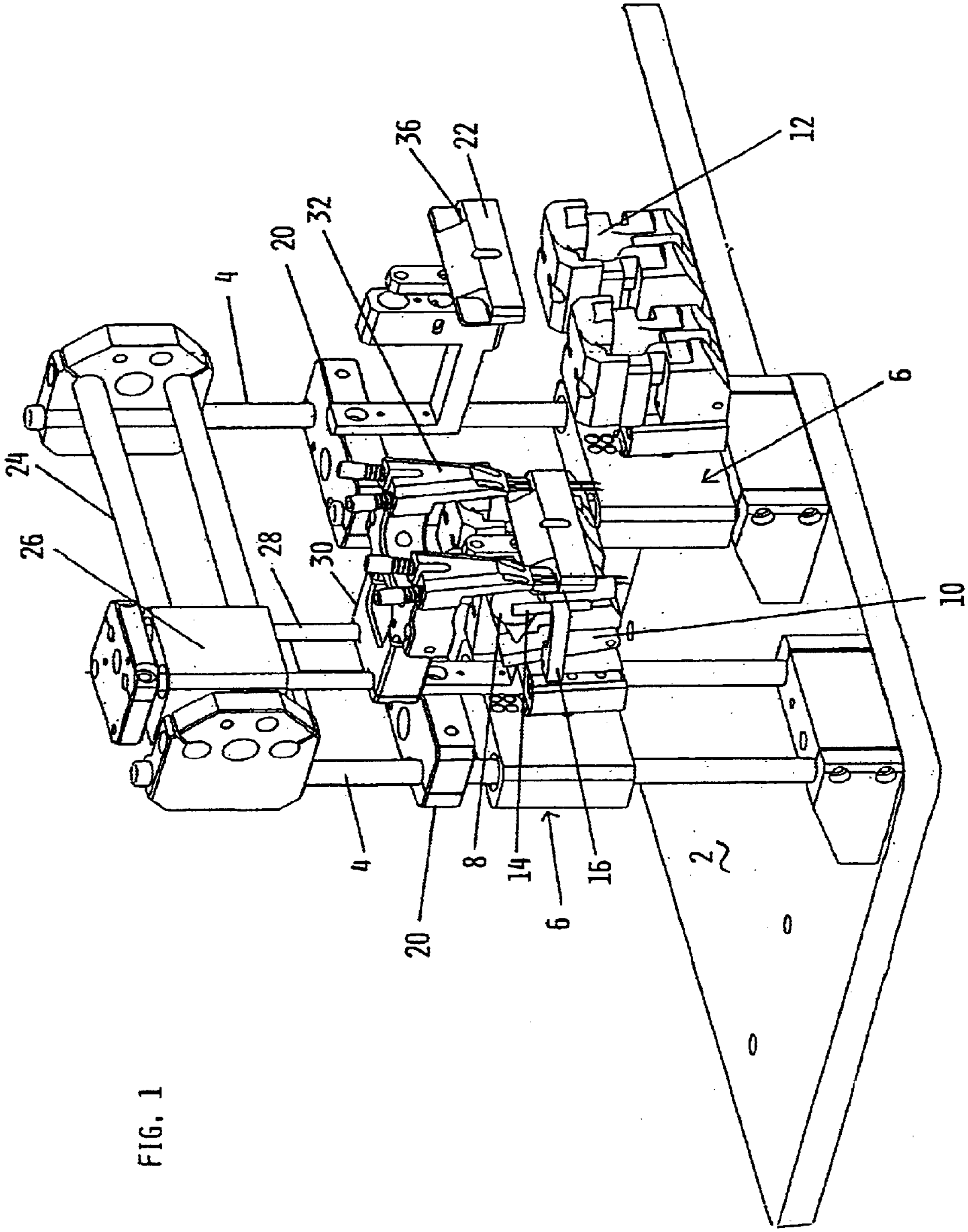
Figure 2:
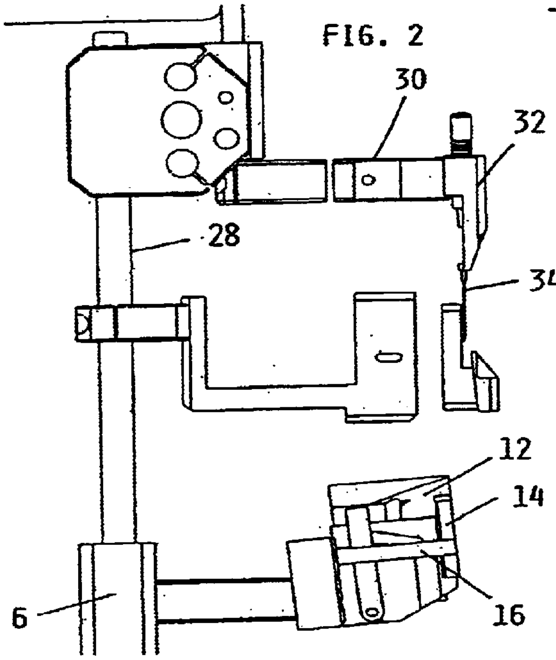
Figure 3:
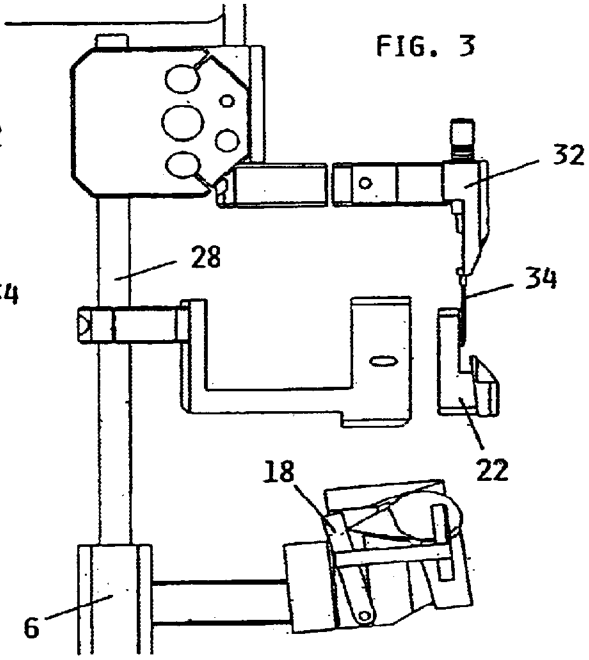
Figure 4:
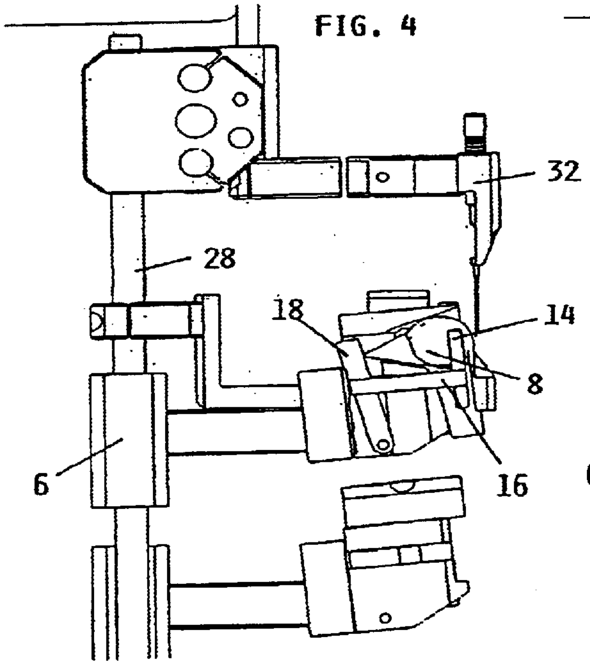
Figure 5:
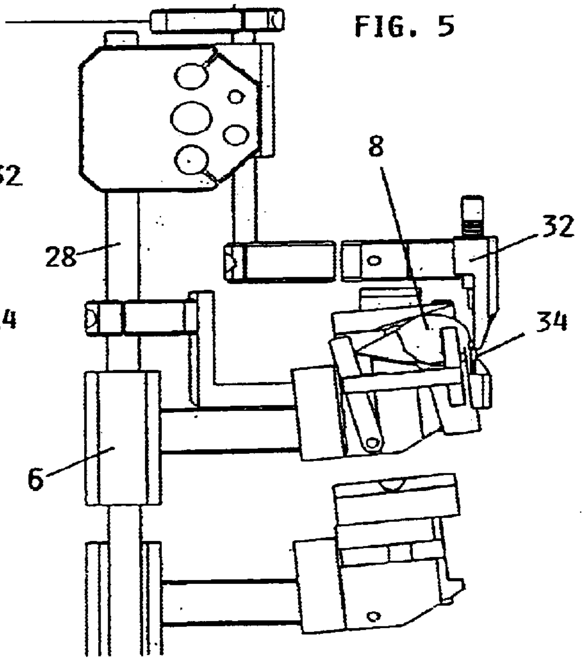

A preferred embodiment of the invention is described in detail hereinafter by way of non-limiting example with reference to the accompanying drawing, on which:

FIG. 1 is an overall perspective view of a machine of the invention, shown without any of its moving member, FIG. 2 is a schematic vertical section through a holder waiting to receive a chick to be vaccinated, FIG. 3 shows it in the same view after the chick has been inserted, but before the presser acts thereon, FIG. 4 shows it in the same view at the moment preceding the descent of the needle, and FIG. 5 shows it in the final needle insertion stage.

As can be seen from the figures, the machine of the invention comprises, on a base 2, a pair of vaccination stations, at each of which there are provided two vertical guide columns 4 along which a unit 6 for treating a pair of chicks 8 to be vaccinated can slide.

The unit 6 is driven in its vertical movements by an actuator, not shown on the drawings, which can move it from a lower stand-by position, shown by the right hand station of FIG. 1, to an upper operational position, shown by the left hand station of FIG. 1.

Each treatment unit 6 comprise a pair of holders 10, each comprising a cavity 12 of dimensions suitable for housing the head of the chick 8 to be vaccinated.

Two locking member, each consisting of a vertical peg 14 mounted on an arm 16 hinged to the holder 10, are provided to the sides of the cavity 12.

The two arms 16 are associated with an actuator, not shown, which drives them in opposite directions between two end positions, in one of which the two pegs 14 are at their maximum distance apart to leave the opening of the cavity 12 completely free, and allow the head of the chick under vaccination to be inserted into it, whereas in the other the two pegs 14 are closer together to an extent which prevents escape of the chick but without squeezing its neck.

The activation command for the actuator, which acts on the two arms 16 of the two pegs 14, is given by a sensor 18 provided in the cavity 12 and activated by the beak of the chick 8 when inserted into the cavity.

Just above the upper end-of-travel position of the corresponding treatment units 6, there is fixed to the two guide columns 4 of each vaccination station a bracket-shaped support 20, to which there is hinged an essentially flat presser member 22 movable horizontally between two end positions, namely an outer rest position, and an inner operational position in which it rests lightly on the neck of two chicks 8 inserted with their head in the corresponding cavity 12 of the holder 10, when this latter is in its upper end-of-travel position, to stabilize them in view of their subsequent vaccination. In particular, said presser member is in the form of a plate comprising two vertical slotted holes 36.

The presser member 22 is driven by an actuator, not shown on the drawings.

One of the two guide columns 4 of each pair is prolonged upwards beyond the bracket-shaped support 20 to support, with the column of the other pair, a horizontal guide 24 for a carriage 26 supporting a further vertical guide 28 for a further carriage 30.

To this there are fixed two supports 32 for one of more needles fed by different bottles containing the vaccines to be injected.

The distance between the axes of the two supports 32 is equal to the distance between the axes of the two cavity 12 of each holder 10.

The carriage 26 is driven horizontally along the guide 24 and the carriage 30 vertically along the guide 28 by separate actuators, not shown on the drawings.

The machine of the invention also comprises a series of automatic controls, limit switches, sensors, etc., enabling the machine to perform the entire operating cycle described hereinafter. For clarity, reference will be made to only one of the two treatment units 6, from the starting condition corresponding to that of the right hand unit in FIG. 1. Under these conditions:

- the treatment unit 6 is in its lower position and the two pegs 14 associated with each cavity 12 are at their maximum distance apart,
- the presser 22 is at rest, ie projecting outwards to its maximum extent,
- the carriage 26 is outside the operating range of the right hand vaccination station, and
- the carriage 30 is raised.

Starting from this condition, the operator positioned in front of the machine takes two chicks and simultaneously inserts their head into the two cavities 12 of the treatment unit 6. As soon as the beak of a chick rests on the sensor 18 of the corresponding cavity 12, it causes the two arms 16 to operate simultaneously so that the two pegs 14 approach the neck of the chick, to retain it with its head in the cavity 12.

When both pairs of pegs 14 have been activated, a subsequent automatic command causes the treatment unit 6 to rise and, on termination of its travel, automatically activate the presser 22, which adheres to the neck of the two chicks, to stabilize that part into which the needles 34 are to be inserted It should be noted that as the presser 22 operates immediately following the upward travel of the treatment unit 6, the two chicks are positioned substantially vertical, ie in the correct position for their subsequent stabilization.

At this stage the carriage 26, which up to now has operated on the pair of chicks retained in the left hand treatment unit, is automatically transferred to the right hand treatment unit, and when the presser 22 ceases to move descends so that the needles applied to the two supports 32 are driven downwards below the skin of the two chicks perfectly stabilized in position, This needle insertion into the neck is facilitated by the guiding offered to the needle travel by the slotted holes 36.

After the injection the carriage 30 is automatically made to rise, the presser 22 is reopened, the treatment unit 6 descends and the pegs 14 open to allow the two chicks 8 to fall spontaneously onto an underlying conveyor belt (not shown on the drawings), which removes them from the vaccination machine.

The aforegoing description relative to the right hand treatment unit is also valid, with the necessary phase displacement, to the left hand treatment unit, on which the operator load a further two chicks to be vaccinated while the two chicks in the right hand unit are being treated.

From the aforegoing it is apparent that the automatic machine of the invention is particularly advantageous and in particular:

it is of simple low-cost construction and of safe and reliable operation, it requires virtually no setting-up or maintenance during use, it enables the operator to impose rather than be compelled to follow the operating rate, which can reach as high as 5000 chicks/h, it is virtually free of any danger, it is virtually silent, the treatment is safe, with precise needle insertion.

What is claimed is:

1. An automatic machine for the multiple vaccination of chicks and similar birds, comprising at least one pair of side-by-side holders, each arranged to receive a chick to be vaccinated, each holder comprising:

a seat into which the head of the chick to be vaccinated is manually inserted, means for automatically locking the chick's head inserted into said seat, a presser acting on the chick to stabilize that neck portion into which the injection is to be effected, means for vertically moving, relative to said presser, said seat in which the head of the chick is inserted and locked, means for automatically operating said presser on termination of said relative movement, at least one needle mounted on a member movable relative to the stabilized chick between said seat and said presser, for its insertion into the chick's neck below the skin, and means for returning said at least one needle, said presser and said locking means after the injection has been effected, to enable the chick to fall spontaneously onto an underlying collection means.

2. A machine as claimed in claim 1, wherein the locking means each consist of a vertical peg mounted on an arm hinged to the holder.

3. A machine as claimed in claim 1, wherein the arms are associated with an actuator which drives them in opposite directions between two end positions, in one of which the two pegs are at their maximum distance apart to leave the opening to the cavity free, whereas in the other the two pegs are close together.

4. A machine as claimed in claim 1, wherein a sensor provided in the cavity and activated by the beak of the chick when inserted into the cavity, to cause the actuator of the locking means to operate.

5. A machine as claimed in claim 1, wherein said presser is in the form of a plate and comprises two vertical slotted holes.

* * * * *